US006240897B1

(12) United States Patent
Han

(10) Patent No.: US 6,240,897 B1
(45) Date of Patent: Jun. 5, 2001

(54) FUEL INJECTION VALVE WITH A MOVABLE VALVE SEAT

(76) Inventor: William Han, 9, Alley 1, Lane 8, Hong-Tao St., Hsi-Chih Town, Taipei (TW)

(*) Notice: Subject to any disclaimer, the term of this patent is extended or adjusted under 35 U.S.C. 154(b) by 0 days.

(21) Appl. No.: 09/083,023

(22) Filed: May 22, 1998

(51) Int. Cl.[7] .............................. F02B 5/00; B29C 45/20
(52) U.S. Cl. .............................................. 123/305; 239/87
(58) Field of Search .............................. 123/305; 239/87, 239/533.1, 533.2, 533.9, 533.15, 585.4, 585.5

(56) References Cited

U.S. PATENT DOCUMENTS 2,740,667 * 4/1956 Dickson et al. ...................... 239/87
4,197,996 * 4/1980 Giardini ................................ 239/87
4,776,516 * 10/1988 Klomp .................................. 239/87
5,484,104 * 1/1996 Kukler .................................. 239/87
5,820,099 * 10/1998 Rahbar et al. .................... 239/585.4

* cited by examiner

*Primary Examiner*—Thomas N. Moulis
(74) *Attorney, Agent, or Firm*—Dougherty & Troxell

(57) ABSTRACT

A fuel injection valve designed for low pressure fuel injection system of internal combustion engines includes a valve needle and a movable valve seat and installs directly on a cylinder head. When the pressure of the cylinder increases, the valve seat can press the valve needle in opposite directions thereby preventing high-pressure gas to flow reversely into fuel system.

3 Claims, 2 Drawing Sheets

FUEL INJECTION VALVE WITH A MOVABLE VALVE SEAT

BACKGROUND OF THE INVENTION

1. Field of the Invention

This invention is related to a fuel injection valve and in particular to one with a movable valve seat.

2. Description of the Prior Art

In conventional four-stroke internal combustion engines, the electromagnetic fuel injection valve is mounted in the intake manifold and the pressure at the outlet of the injection valve is lower or equal to the atmospheric pressure, so that a low pressure fuel injection system (about 2–3 kg/cm$^2$) will suffice for efficient working.

However, for two-stroke internal combustion engines, it is proposed to inject fuel or fuel-air mixture after the exhaust port is closed, in order to reduce the amount of fuel leaking into the exhaust pipe at the time of scavenging. Hence, it is necessary to mount the injection fuel valve on the cylinder. Although a high pressure injection system is workable in this case, it will increase the cost. If a low pressure injection system is used, it is necessary to use a mushroom valve in order to prevent the gas from flowing reversely into the fuel system, as described in U.S. Pat. No. 4,986,247, Kushibe et al 1/1991, and U.S. Pat. No. Re. 34,945 Sayer et al 5/1995. Although the air auxiliary fuel injection valve can promote the atomization of fuel, it is still impossible to obtain the optimum fuel distribution.

Therefore, it is an object of the present invention to provide an improved fuel injection valve which can obviate and mitigate the above-mentioned drawbacks.

SUMMARY OF THE INVENTION

This invention is related to an improved fuel injection valve and in particular to one with a movable valve seat.

It is the primary object of the present invention to provide an improved fuel injection valve which is low in cost in comparison with those adapted for use in high pressure fuel injection system.

It is another object of the present invention to provide an improved fuel injection valve which is mounted on the cylinder head for directly ejecting fuel or mixture into the cylinder.

It is still another object of the present invention to provide an improved fuel injection valve including a needle valve and a movable valve seat which will push the needle valve in an opposite direction to prevent high pressure gas from flowing reversely into the fuel system.

It is still another object of the present invention to provide an improved fuel injection valve which may be adapted to a single-hole or multi-hole ejecting orifice to mix air with fuel in correct proportions and obtain good dispersity.

It is still another object of the present invention to provide an improved fuel injection valve which is fit for use with liquid or gas fuel and the injection of which can be accurately controlled.

It is a further object of the present invention to provide an improved fuel injection valve which is externally connected to other fuel valve or air valve so as to mix fuel or fuel-air mixture into the cylinder.

Other objects of the invention will in part be obvious and in part hereinafter pointed out.

The invention accordingly consists of features of constructions and method, combination of elements, arrangement of parts and steps of the method which will be exemplified in the constructions and method hereinafter disclosed, the scope of the application of which will be indicated in the claims following.

DETAILED DESCRIPTION OF THE PREFERRED EMBODIMENT

The present invention can be applied to an electromagnetic fuel injection valve or an automatically open-close fuel injection valve as required.

Figure 1:
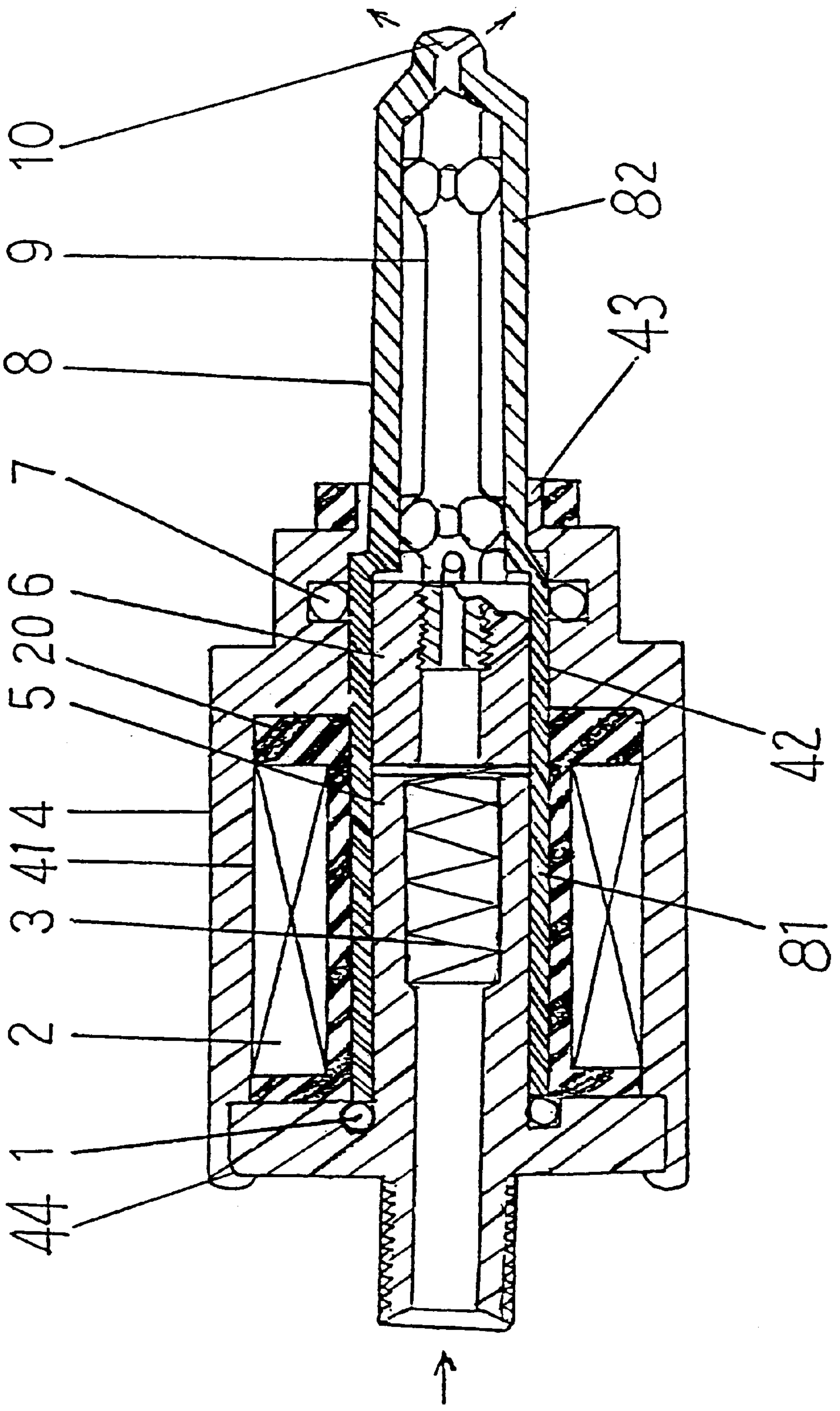
FIG. 1 is a sectional view of an electromagnetic fuel injection valve according to the present invention.

With reference to FIG. 1, the electromagnetic fuel injection valve according to the present invention generally comprises a packing 1 made of elastomer, a sleeve 20 made of insulating material, a solenoid 2, a spring 3, a valve body 4, a stator 5, an armature 6, a O-ring 7, a valve seat 8, and a valve needle 9.

The valve body 4 is formed with a first cylindrical recess 41 at an end and a second cylindrical recess 42 at another end and coaxial with the first cylindrical recess 41. The solenoid 2 is fitted on the sleeve 20 which is in turn arranged within the first cylindrical recess 42 of the valve body 4. The valve seat 8 is a tubular member fitted in the valve body 4 and having a first portion 81 arranged in the first cylindrical recess 41 of the valve body 4 and a second portion 82 extending out of the second cylindrical recess 42 of the valve body 4. The first portion 81 of the valve seat 8 is made of non-magnetic metallic tubular member. The outer end the second portion 82 of the valve seat 8 is formed with outlets 10. The armature 6 is fitted within the valve seat 8 and formed with an axial hole (shown but not numbered). The stator 5 is arranged in the valve seat 8 and provided with a spring 3 at an end urging against the armature 6. The valve needle 9 is made of hardened steeland has two sets of four circumferential ridges to be concentric with the valve seat 8 and enabling passage of fuel. The structure of the valve needle 9 is well known in the art and considered a part of the invention. The valve needle 9 is inserted into the second portion 82 of the valve seat 8 and has an end threadedly engaged with the axial hole of the armature 6. The O-ring 7 is fitted between the valve body 4 and the valve seat 8.

As electric current passes through the solenoid 2, magnetic lines of force will be generated to go through the valve body 4, the stator 5, the armature 6 and the valve seat 8 thereby forming a magnetic field which will attract the armature 6 to contact the stator 5 and therefore opening the valve needle 9 to enable fuel to flow out of the outlets 10. The valve needle 9 will be opened after supplying electricity for a time period of 2/1000 sec. If the fuel pressure is constant, the amount of fuel injected out of the injection valve is proportional to the time.

When no more electric current flows through the solenoid 2, the spring 3 and the fuel pressure will push the valve needle 9 back to engage closedly with the valve seat 8 thereby stopping injection.

The above injection must be accomplished in a very short time, because if the pressure in the cylinder is higher than the fuel pressure, the injection will be stopped and the valve seat 8 will be pushed to move against the valve needle 9 thereby pushing the armature 6 to contact the stator 5. The higher the pressure in the cylinder is, the larger the engaging force is between the valve needle 9 and the valve seat 8, so that the high pressure gas will not flow reversely into the fuel system. If the pressure in the cylinder is lower than the fuel pressure, the valve seat 8 will be pushed by the fuel pressure and the elastomer 1 to its original position.

Figure 2:
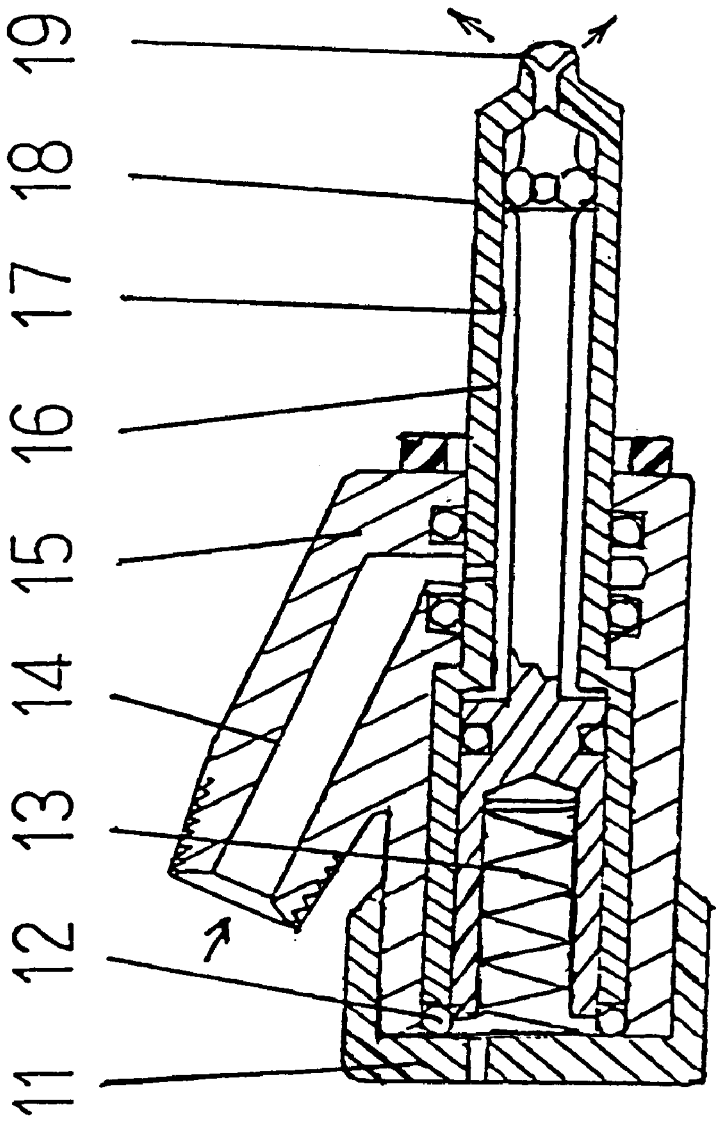
FIG. 2 is a sectional view of an automatically open-close fuel injection valve according to the present invention.

Referring to FIG. 2, the automatically open-close fuel injection valve according to the present invention comprises a rear cover 11, an elastomer 12, a spring 13, a valve body 15, a valve needle 16, and a valve seat 18. The valve body 15 is formed with an axial through hole and a branch passage in communication with the axial through hole. The valve seat 18 is fitted in the valve body 15 and has outlets at the outer end. A portion of the valve seat 19 extends out of the valve body 15 and keeps in air-tight manner therewith. The valve needle 16 has a set of four circumferential ridges to be concentric with the valve seat 18 and enabling passage of fuel. The structure of the valve needle 16 is well known in the art and not considered a part of the invention. The valve needle 16 is arranged within the valve seat 18 and has a recess at an end in which is mounted the spring 13. The cover 11 is engaged with the rear end of the valve body 15. The elastomer 12 is fitted between the valve seat 18 and the cover 11.

When fuel or air-fuel mixture enters into a valve chamber 17 of the valve seat 18 through the branch passage 14, the fuel pressure will push the valve needle 16 to move away from the outlets of the valve seat 18 thereby enabling fuel to be injected into the cylinder.

When the fuel pressure is lowered to a predetermined value, the spring 13 will push the valve needle 16 to close the outlets of the valve seat 18.

When the pressure in the cylinder increases, the valve seat 18 will be forced to push the valve needle 16 to contact the rear cover 11. The higher the pressure is in the cylinder, the higher the engaging force is between the valve seat 18 and the valve needle 16 thus preventing the high pressure gas from flowing reversely into the fuel system. When the pressure in the cylinder decreases, the elastomer 12 will push the valve seat 18 back to its original position.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

I claim:

1. An electromagnetic fuel injection valve with a movable valve seat comprising a valve body, a solenoid, a stator, an armature and valve needle assembly, and a valve seat assembly, adapted to be mounted on a cylinder head of an internal combustion engine for directly injecting fuel into a cylinder, said armature and valve needle assembly being attracted by magnetic force to overcome force of a spring to contact said stator thereby injecting fuel into said cylinder;

said valve seat assembly being movably fitted within said valve body, engaged with said valve body in air-tight manner, having a set of four circumferential ridges to keep concentric with said valve seat assembly having a front end made of hardened steel and protruding out of said valve body and enabling said valve needle to move therein to open or close a single-hole or multi-hole nozzle, the rear part made of non-magnetic metallic tube in which are fitted said stator and armature, whereby when said cylinder is at low pressure, said valve seat is subjected to fuel pressure, spring force and elastic force of an elastomer to position a shoulder at an intermediate portion in said valve body, and when said cylinder is at high pressure, said valve seat will be forced to move;

said armature and valve needle assembly provided at a front end with a valve needle made of hardened steel and engageable with said valve seat assembly, said valve needle having two sets of four circumferential ridges so as to be concentric with said valve seat assembly for enabling passage of fuel and provided at a rear end with an armature made of soft iron which forms a closed magnetic circuit with said stator and said valve body, said stator receiving a spring for pushing said armature and valve needle assembly to original position thereby supplying fuel through a hole of said stator and a hole of said armature.

2. An automatically open-close fuel injection valve with a movable valve seat adapted to be mounted on a cylinder head for directly injecting fuel, air or air-fuel mixture into a cylinder, comprising a valve body, a valve seat assembly, and a valve needle assembly:

said valve body in which is fitted said valve seat assembly and having a front end extending outwardly, a chamber having a fuel inlet at an intermediate portion in communication with said chamber, said chamber being engaged with said valve seat assembly at two ends in air-tight manner, a cover engaged with a rear end of said valve body and formed with a small hole in communication with atmosphere;

said valve seat assembly being movably fitted within said valve body, having a front end protruding out of said valve body, a single-hole or multi-hole nozzle and a small hole at an intermediate portion thereof for permitting fuel to flow therein, said valve seat having a larger rear end for positioning a shoulder thereof, an elastomer fitted between a rear cover of said valve body for keeping said valve seat in position, thereby enabling said valve needle assembly to move therein;

said valve needle assembly being movably fitted within said valve seat assembly, having a conical front end engageable with said valve seat assembly in air-tight manner and a set for four circumferential ridges to keep concentric with said valve seat assembly, kept concentric with said valve seat assembly for passage of fuel, a larger rear end engaged with said valve seat assembly in air-tight manner, and a spring at a rear end for keeping said valve needle assembly in position, thereby automatically opening said valve needle assembly to inject atomized fuel into said cylinder when fuel pressure exceeds a predetermined value, but automatically close said valve needle assembly when fuel pressure is lower than the predetermined value.

3. A method adapted for use in needle fuel injection valve of an internal combustion engine, utilizing a movable valve seat to prevent high pressure gas from flowing reversely into fuel system, said method being applicable to liquid, gas, or mixture low pressure fuel injection system, said needle fuel injection valve being arranged on a cylinder head for injecting fuel directly into a cylinder through a single-hole or multi-hole nozzle, said movable valve seat being kept in a fixed position when pressure in a cylinder is lower than or equal to fuel pressure, whereby when pressure in said cylinder is higher than a predetermined value (slightly higher than fuel pressure), said valve seat will be urged to move and force said valve needle until said valve needle reaches a stop position thereby producing a force directly proportional to pressure in said cylinder between said valve needle and said valve seat in the meantime and therefore providing air-tight seal to prevent high pressure gas from flowing reversely into the fuel system.

* * * * *